United States Patent [19]

Ando et al.

[11] 3,892,473

[45] July 1, 1975

[54] METHOD OF WRITING ADDITIONAL INFORMATION IN READ-ONLY MEMORY

[75] Inventors: Shigeru Ando; Kazunaru Tomishima; Akira Nishikawa, all of Amagasaki, Japan

[73] Assignee: Mitsubishi Denki Kabushiki Kaisha, Japan

[22] Filed: Feb. 15, 1973

[21] Appl. No.: 332,764

[30] Foreign Application Priority Data

Feb. 15, 1972 Japan ................................ 47-15812

[52] U.S. Cl. ........... 350/162 R; 264/1; 340/173 TP; 346/77 E; 350/162 SF

[51] Int. Cl. ........................................... G02b 27/28

[58] Field of Search ........... 350/3.5, 162 R, 162 SF, 350/162 ZP; 346/77 E; 340/173 TP; 264/1

[56] References Cited

UNITED STATES PATENTS

| | | | |
|---|---|---|---|
| 734,134 | 7/1903 | Porter | 350/162 R |
| 3,046,839 | 7/1962 | Bird et al. | 350/162 R |
| 3,312,955 | 4/1967 | Lamberts et al. | 350/162 SF |
| 3,463,118 | 8/1969 | Wood | 350/162 R |
| 3,497,576 | 2/1970 | Dvorin | 264/1 |
| 3,652,162 | 3/1972 | Noble | 350/162 SF |
| 3,732,363 | 5/1973 | Glenn | 350/162 SF |

*Primary Examiner*—Ronald J. Stern
*Attorney, Agent, or Firm*—Robert E. Burns; Emmanuel J. Lobato; Bruce L. Adams

[57] ABSTRACT

To write an additional bit of information in a memory in the form of a phase diffraction grating formed on a transparent plastic film by stamping on the film an embossing die including a grating, the same die is first located at its angular position as determined by the bit of information measured with respect to a reference and then stamped upon the diffraction grating on the film to form a corresponding diffraction grating in superposed relationship with the preceding grating. A die may be used different in grating constant from the first die.

15 Claims, 6 Drawing Figures

METHOD OF WRITING ADDITIONAL INFORMATION IN READ-ONLY MEMORY

BACKGROUND OF THE INVENTION

This invention relates to a method of writing additional information in a read-only memory.

It has been previously practiced to utilize semiconductor or magnetic memory elements to form read-only memories. Such memories, however, have been low in memory capacity. On the other hand, the utilization of optical memory elements is considered to be promising in the field of read-only memory technique because the resulting density and capacity are high leading to a low cost for each unit of information. However, optical memory systems known up to now have been disadvantageous in that it is impossible to write bits of information one after another at will and with ease.

SUMMARY OF THE INVENTION

Accordingly it is an object of the present invention to provide an improved read-only memory at low cost permitting additional bits of information to be easily written therein at will.

The present invention accomplishes this object by the provision of a method of writing an additional bit of information in a read-only memory comprising the step of forming, upon a phase diffraction grating providing a read-only memory on a record medium of plastic material, a different phase diffraction grating through a plastic deformation of the plastic material due to a pressure applied to the record medium, the different phase diffraction grating having a selected one of the parameters as determined by an additional bit of information to be written different from that of the preceding grating.

The phase diffraction grating corresponding to the bit of information may be preferably formed in superposed relationship upon the phase diffraction grating previously formed on the record medium by locating an embossing die including a grating complementary in configuration to the preceding phase diffraction grating above the latter grating at its angular position as determined by the bits of information with respect to a reference and stamping the embossing die upon the preceding grating on the record medium.

BRIEF DESCRIPTION OF THE DRAWING

The present invention will become more readily apparent from the following detailed description taken in conjunction with the accompanying drawing in which.

DESCRIPTION OF THE PREFERRED EMBODIMENTS

Figure 1:
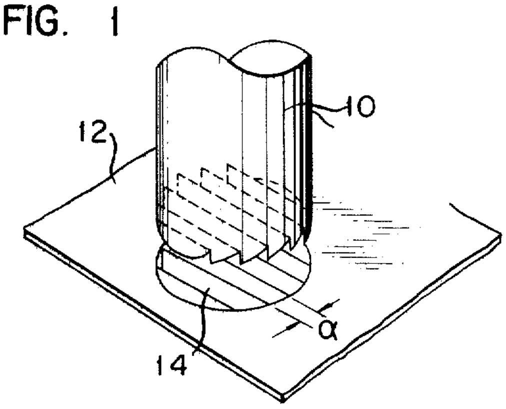
FIG. 1 is a fragmental perspective view illustrating a method of forming a read-only memory in accordance with the principles of the present invention.

Referring now to the drawing and FIG. 1 in particular, there is illustrated a method of forming a diffraction grating on a record medium in accordance with the principles of the present invention. As shown in FIG. 1, an embossing die 10 is provided on the free end face with a single diffraction grating complementary in configuration to a diffraction grating to be embossed including a plurality of parallel grooves having a predetermined cross section and disposed at predetermined equal intervals. The embossing die 10 is oriented in its predetermined angular position and stamped on a film of any suitable transparent plastic material 12 under suitable pressure to form a diffraction grating 14 thereon. Examples of such a plastic material include polyvinyl chlorides, polyvinyl acetates, polyethylene terephthalate whose film is available under "Mylar" (Trade Mark), etc. The grating thus formed is referred to hereinafter as an elementary grating.

Figure 2:
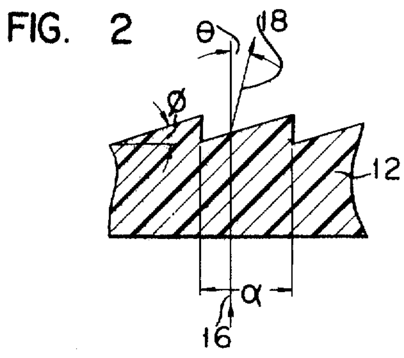
FIG. 2 is a fragmental cross sectional view of a phase type elementary diffraction grating useful in explaining the diffraction of a beam of monochromatic light.

The diffraction grating embossed on the plastic film is shown, by way of example, in FIG. 2 as being of a saw toothed cross section. The grating as shown in FIG. 2 is known as an echelette grating characterized by a high efficiency of diffraction. With a beam of parallel monochromatic light 16 such as laser light incident perpendicularly upon the rear flat surface of the plastic film 12, a beam of diffracted light 18 can be emitted in a direction forming an angle of $\theta$ with the incident beam of light holding the relationship.

$$d \sin \theta = n\lambda$$

where $d$ designates a grating constant or the width of the grooves, $\lambda$ is a wavelength of incident light and $n$ is an integer. It is assumed that the $n$ equals one only for purposes of illustration. In order to deflect the beam of diffracted light 18 through an angle of $\theta$ with respect to the beam of incident light, one must hold the relationships $$\phi = \tan^{-1} \sin \theta / v - \cos \theta \tag{1}$$

and $$d = \lambda / \sin \theta \tag{2}$$

where the groove has its bottom tilted at an angle of $\phi$ to the rear plane of the plastic film 12, and the material of the plastic film has an index of refraction of $v$. That is to say, the values of $\phi$ and $d$ should be determined to fulfil the above relationships (1) and (2). For example, assuming that the $v$, $\lambda$ and $\theta$ have values of 1.5, 0.8 $\mu$ and 30° respectively, the angle $\phi$ is of 38°17′ while the grating constant $d$ is of 1.6 $\mu$. Thus it will be appreciated that the $\theta$ can be changed by varying either or both of $\phi$ and $d$ for the purpose of producing different type of diffraction grating. On the other hand, while the $\theta$ remains unchanged, a direction in which the beam of diffracted light is emitted from the grating can be differently turned about the optical axis of the beam of incident light. More specifically, the embossing die 10 can be rotated about the longitudinal axis thereof and therefore the normal to the plane of the plastic film through an angle $\psi$ from that direction in which a beam of diffracted light is emitted from a grating formed by the same die located at its initial angular position. The angle $\psi$ may be called "a rotational angle". Thus the diffraction grating has the slope $\phi$ of the groove's bottom and the grating constant $d$ determining the diffraction angle $\theta$ and the rotational angle $\psi$ or the angle of run of the grooves relative to a reference as the parameters.

Figure 3A:
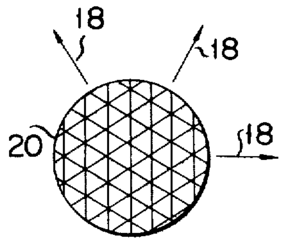
FIG. 3*a* is a plan view of a multiple phase diffraction grating and beams of monochromatic light diffracted therefrom.
Figure 3B:
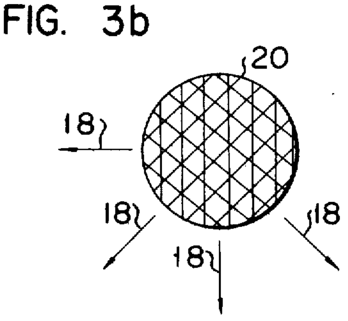
FIG. 3*b* is a view similar to FIG. 3*a* but illustrating a modification of the multiple grating shown in FIG. 3*a;*

The process just described can be repeated at the same position on the plastic film as required to form a multiple phase grating including a plurality of elementary gratings disposed in superposed relationship at different angular positions. FIG. 3*a* shows one example of such a multiple phase grating 20 including three elementary gratings. The grating 20 emits three beams of diffracted light whose projections on the plane of the plastic film are shown by the arrows 18. FIG. 3*b* shows a multiple phase grating 20 including four elementary gratings adapted to emit four beams of diffracted light 18 in different directions.

Therefore a plurality of elementary grating having a common diffraction angle $\theta$ and different rotational angles $\psi$ can be embossed on a plastic film to form a multiple phase grating thereon in a simple manner. In general, a plurality of elementary gratings having different diffraction angles $\theta$ by having either or both of the $d$ and $\phi$ thereof changed and different rotational angles $\psi$ each selected for a different one of the diffraction angles $\theta$ can be embossed in superposed relationship at a common position on a plastic film to form a multiple phase grating thereon. The multiple phase grating thus formed is responsive to a beam of monochromatic light perpendicularly incident upon the rear plane thereof to emit a plurality of beams of diffracted light in different directions as determined by the diffraction and rotational angles $\theta$ and $\psi$ of the elementary gratings. Thus a combination of those $\theta$'s and $\psi$'s can correspond to a single event.

Where an additional bit of information should be added to a particular multiple phase grating, it is required only to superpose an elementary grating having a diffraction angle and/or a rotational angle as determined by the additional bit of information on the multiple phase grating by the embossing process as previously described in conjunction with FIG. 1. For more than one additional bit of information, the process just described in repeated with each of the additional bits of information. Similarly an additional event can be written in on a plastic film having multiple phase gratings embossed thereon. More specifically, a plurality of embossing dies for forming elementary gratings having different diffraction angles of $\theta_1$, $\theta_2$, $\theta_3$ . . . as determined by the additional event are successively selected and stamped at a predetermined common position on plastic film including multiple phase gratings to be superposed on the preceding gratings at selected rotational angles of $\psi_1$, $\psi_2$, $\psi_3$ . . . as determined by the event to form a memory or multiple phase grating for the additional event. If desired, the process just described may be repeated with each of the additional events excepting that the stamped position on the plastic film varies for each event. The depth of each of the embossing dies is approximately equal and thus the grooves of each grating are equal in depth. The bits of information can then be scattered on the recording medium and have an equal area whereby the beams of light that are reproduced will each have the same intensity.

Figure 4:
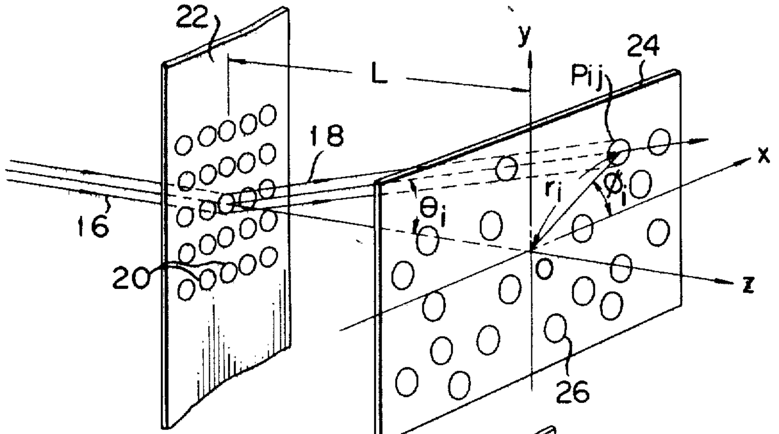
FIG. 4 is a fragmental perspective view of a system for reproducing data from a memory tape having a multiplicity of multiple phase diffraction gratings recorded thereon in accordance with the principles of the present invention.

Data represented by a multiplicity of multiple phase gratings embossed on a transparent plastic film in the manner as above described can be effectively read out by a data reproducing system as shown in FIG. 4. In the arrangement of FIG. 4, a memory tape 22 has a multiplicity of multiple phase gratings as above described arranged in rows and columns thereon and spaced away in parallel relationship from a data sensing surface 24 by a distance of L with the center of the sensing surface lying in a plane orthogonal to the plane of the memory tape 22 and passing through the longitudinal axis of the latter. It is assumed that a three dimensional orthogonal coordinate system has an origin 0 at the center of the plane of the data sensing surface 24, an $x$ $y$ plane coinciding with the sensing plane and a $z$ axis extending away from the memory tape 22. A multiplicity of light sensors 26 are disposed in a plurality of concentric circles having the centers at the origin 0 as shown at circle in FIG. 4.

When irradiated with a beam of monochromatic light 16 along the $z$ axis, the multiple gratings as above described emit beams of diffracted light 18 in directions as determined by the embossing conditions $\theta_i$ and $\psi_i$ as above described. Only for purposes of illustration, a single beam of diffracted light 18 from one multiple phase grating 20 is shown as being emitted in a direction forming an angle of $\theta_i$ with the $z$ axis and having an angle of $\psi_i$ measured counterclockwise from the $x$ axis. That beam of diffracted light reaches the data sensing surface 24 at a position $P_{ij}$ lying in a circle whose radius $r_i$ is equal to $L \cdot \tan\theta_i$ with an angle of $\psi_j$ formed between the $x$ axis and a straight line passing through the origin 0 and the point $P_{ij}$. A light sensor 26 disposed at that position $P_{ij}$ is responsive to the beam of diffracted light 18 reaching it to read out the associated data.

Figure 5:
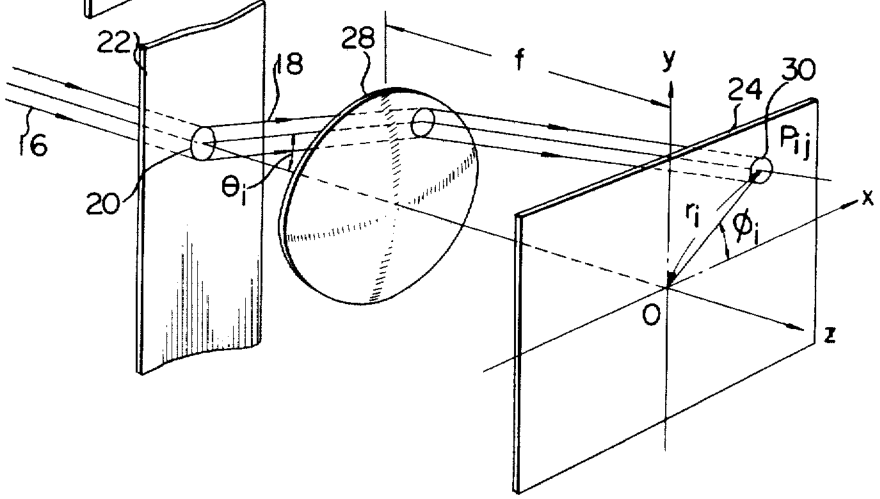
FIG. 5 is a view similar to FIG. 4 but illustrating a modification of the arrangement shown in FIG. 4.

FIG. 5, wherein like reference numerals and characters designate the components corresponding or similar to those shown in FIG. 4, illustrates a modification of the arrangement as shown in FIG. 4. The arrangement is substantially identical to that shown in FIG. 4 excepting that a lense 28 having a focal length of $f$ is disposed between the memory film 22 and the data sensing surface 24 and at distance from the sensing surface 24 equal to the focal length $f$ of the lens 28. It is to be understood that the lens 28 has its optical axis lying on the $z$ axis.

As in the arrangement of FIG. 4, a beam of monochromatic light 18 diffracted from a multiple phase grating 22 is emitted in a direction as specified by both diffraction angle of $\theta_j$ and a rotational angle of $\psi_j$ and falls upon the lens 28 and then forms a lightspot 30, on the data sensing surface 24 at a position $P_{ij}$ defined by a radius $r_i$ equal to $f \cdot \tan\theta_i$ and an angle of $\psi_j$ with formed between the $x$ axis and a straight line passing through the origin 0 and the point $P_{ij}$. In that event, a light sensor (not shown) located at the position $P_{ij}$ senses a combination of diffraction plane $\theta_i$ and rotational plane $\psi_j$ for the associated embossing die (not shown) as a unit of information.

While the present invention has been illustrated and described in conjunction with a few preferred embodiments thereof, it is to be understood that various changes and modifications may be resorted to without departing from the spirit and scope of the invention. For example, the grooves disposed on the free end face of any embossing die is not restricted to the echelette configuration and may be of any other cross section such as a sinusoidal or square cross section. Also the light sensors on the data sensing surface may be replaced by a pickup tube. Upon practicing the present invention the use of an embossing process is considered to be effective but any other process may be utilized if desired. While record medium has been described to be transparent, it is to be understood that it may be opaque. In the latter event, the beam of diffracted light from the diffraction grating on the record medium is formed of light reflected therefrom.

What we claim is:

1. A method of writing an additional bit of information in a read-only memory, including the step of superimposing, upon a phase diffraction grating defining a memory formed on a record medium of plastic material, a separate phase diffraction grating through a plastic deformation of the plastic material due to a pressure applied to the record medium, the separate phase diffraction grating having a selected one of parameters defining the direction of diffraction as determined by an additional bit of information to be written from that of the preceding diffraction grating.

2. A method of writing an additional bit of information in a read-only memory as claimed in claim 1 wherein the selected parameter is a grating constant.

3. A method of writing an additional bit of information in a read-only memory as claimed in claim 1 wherein the selected parameter is an angle of run of parallel grooves of the diffraction grating with respect to a reference.

4. A method of writing an additional bit of information in a read-only memory using an embossing die having a grating including a plurality of parallel grooves, and a record medium of transparent plastic material having embossed thereon a phase diffraction grating by stamping the embossing die on the record medium, which method includes the steps of locating the embossing die above the phase diffraction grating so that the parallel grooves thereof has an angle of run as determined by an additional bit of information to be written with respect to a reference, and stamping the embossing die upon the preceding the diffraction grating on the record medium to form a corresponding phase diffraction grating superimposed on the preceding diffraction grating.

5. A method of writing an additional bit of information in a read-only memory as claimed in claim 1 wherein the superimposed phase diffraction gratings are of an echelette type.

6. A method of writing an additional bit of information in a read-only memory as claimed in claim 4, wherein the superimposed phase diffraction gratings are of the echelette type.

7. A method for writing additional bits of information in a read only memory of the type having an impressible recording medium and a first diffraction grating impressed thereon in a given area and having a first phase orientation with respect to the recording medium and a first diffraction angle both corresponding to a first bit of information, said method comprising: impressing a second diffraction grating on the recording medium superimposed on the first diffraction grating in said given area without impairing the effectiveness of said first diffraction grating and having a second phase orientation different from said first phase orientation and a second diffraction angle, both said second phase orientation and said second diffraction angle corresponding to a second bit of information to be written into the memory in addition to the first bit of information.

8. A method according to claim 7, wherein said first and second diffraction angles are equal.

9. A method according to claim 7, further comprising the steps of impressing at least one additional diffraction grating on the recording medium superimposed on the first and second diffraction gratings and without impairing the effectiveness of said first and second diffraction gratings wherein each additional diffraction grating has a different phase orientation and a given diffraction angle corresponding to an additional bit of information.

10. A method according to claim 7, wherein said step of impressing the second diffraction grating on the first diffraction grating comprises impressing the recording medium with a die having an angular orientation corresponding to the phase orientation of said second diffraction grating.

11. A method according to claim 7, wherein said second diffraction grating comprises echelette type diffraction grating.

12. An apparatus for writing bits of information in a read only memory of the type having an impressible recording medium comprising means for impressing a first diffraction grating on the recording medium in a given area and having a first phase orientation with respect to the recording medium and a first diffraction angle both corresponding to a first bit of information; and means for impressing at least a second diffraction grating on the recording medium superimposed on the first diffraction grating in said given area without impairing the effectiveness of said first diffraction grating and having a second phase orientation different from said first phase orientation and a second diffraction angle, both said second phase orientation and said second diffraction angle corresponding to a second bit of information to be written into the memory in addition to the first bit of information.

13. An apparatus according to claim 12, wherein said first and second diffraction angles are equal.

14. An apparatus according to claim 12, wherein said means for impressing comprises a die having an angular orientation corresponding to the phase orientation of said second diffraction grating.

15. An apparatus according to claim 12, wherein said second diffraction grating comprises echelette type diffraction grating.

* * * * *